United States Patent
Ieda

(10) Patent No.: US 6,868,864 B2
(45) Date of Patent: Mar. 22, 2005

(54) WATER FLOW CONTROL VALVE

(75) Inventor: João José Cardinali Ieda, Vila Independencia (BR)

(73) Assignee: Wahler Metalurgica Ltda, Sao Paulo (BR)

(*) Notice: Subject to any disclaimer, the term of this patent is extended or adjusted under 35 U.S.C. 154(b) by 115 days.

(21) Appl. No.: 10/451,619

(22) PCT Filed: Jan. 31, 2002

(86) PCT No.: PCT/BR02/00018
§ 371 (c)(1),
(2), (4) Date: Jun. 20, 2003

(87) PCT Pub. No.: WO02/061312
PCT Pub. Date: Aug. 8, 2002

(65) Prior Publication Data
US 2004/0055653 A1 Mar. 25, 2004

(30) Foreign Application Priority Data

Feb. 1, 2001 (BR) .......................... 8100181 U

(51) Int. Cl.⁷ ............................................. F16K 11/08
(52) U.S. Cl. ................................................. 137/625.29
(58) Field of Search ................... 137/625.29, 625.46; 237/12.3 B

(56) References Cited

U.S. PATENT DOCUMENTS

| 1,765,984 A | | 6/1930 | Kocourek et al. |
| 4,972,877 A | | 11/1990 | Halemba et al. |
| 5,893,392 A | | 4/1999 | Spies et al. |
| 5,967,185 A | * | 10/1999 | Baruschke et al. .... 137/625.29 |
| 6,155,296 A | * | 12/2000 | Roman .................. 137/625.29 |

* cited by examiner

Primary Examiner—John Fox
(74) Attorney, Agent, or Firm—William J. Sapone; Coleman Sudol Sapone P.C.

(57) ABSTRACT

Used in the automobile industry, and more specifically in the driver's cab heating system, the valve is installed between the link between the engine and the radiator and the cab's heating system. It consists of a housing unit (1) which has a circular compartment (2) which houses the rotor (25) which has a side wall which protrudes a few millimeters (28) and has attached to it, by means of an "8"-shaped lever (36), a sealing unit, consisting of an O ring (33) and its support (34). This sealing unit and the side wall (28) are responsible for blocking off the flow of liquid to the cab's heating system and the by-pass, respectively. The previously mentioned compartment has a tubular inlet (3) and outlet (5) and is attached by a linking channel (14) to the adjacent cavity (10), to which is attached an outlet tube (11) and a return opening (13) and the rotor (25) is operated manually by means of an external lever (42).

9 Claims, 10 Drawing Sheets

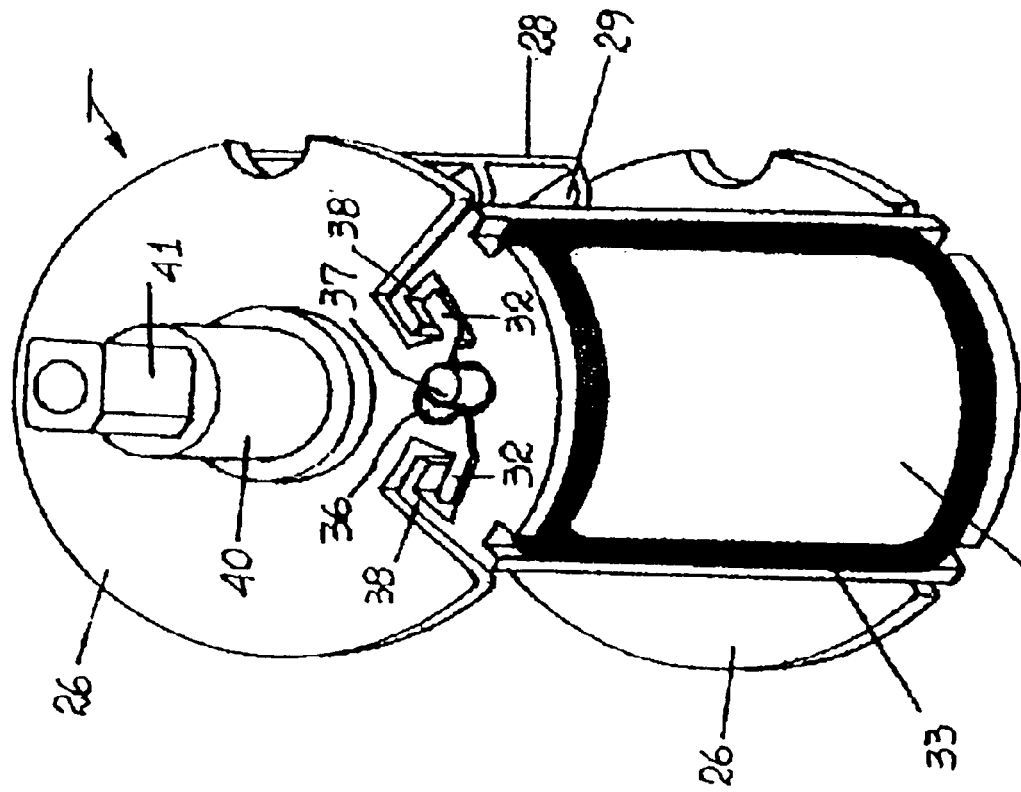
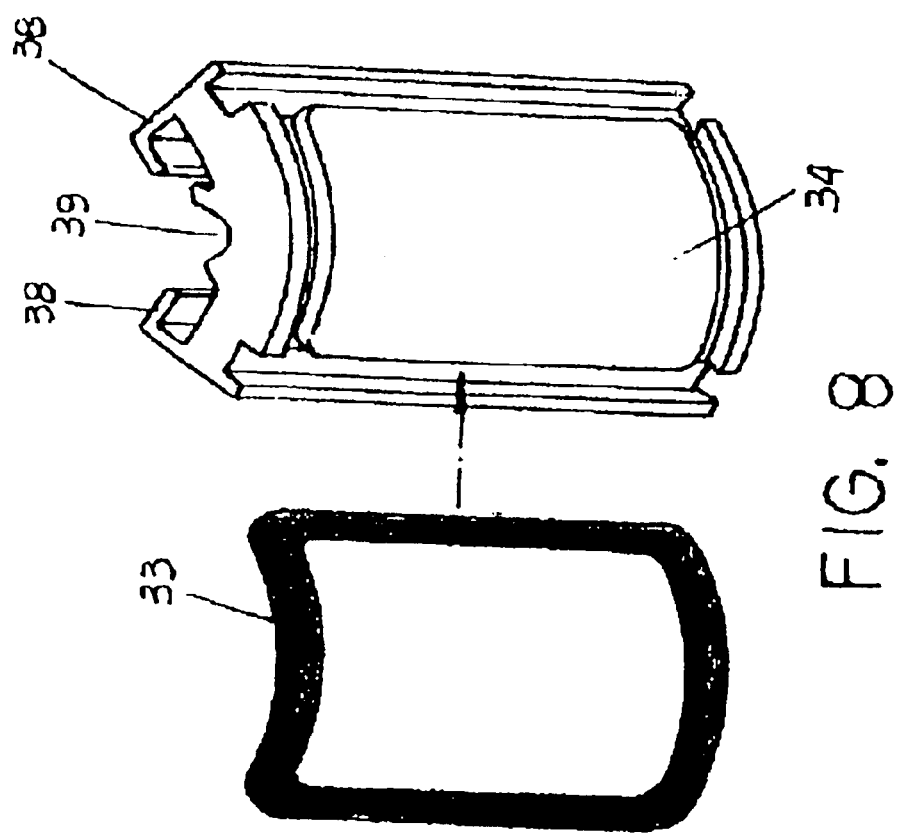
FIG. 9
FIG. 8

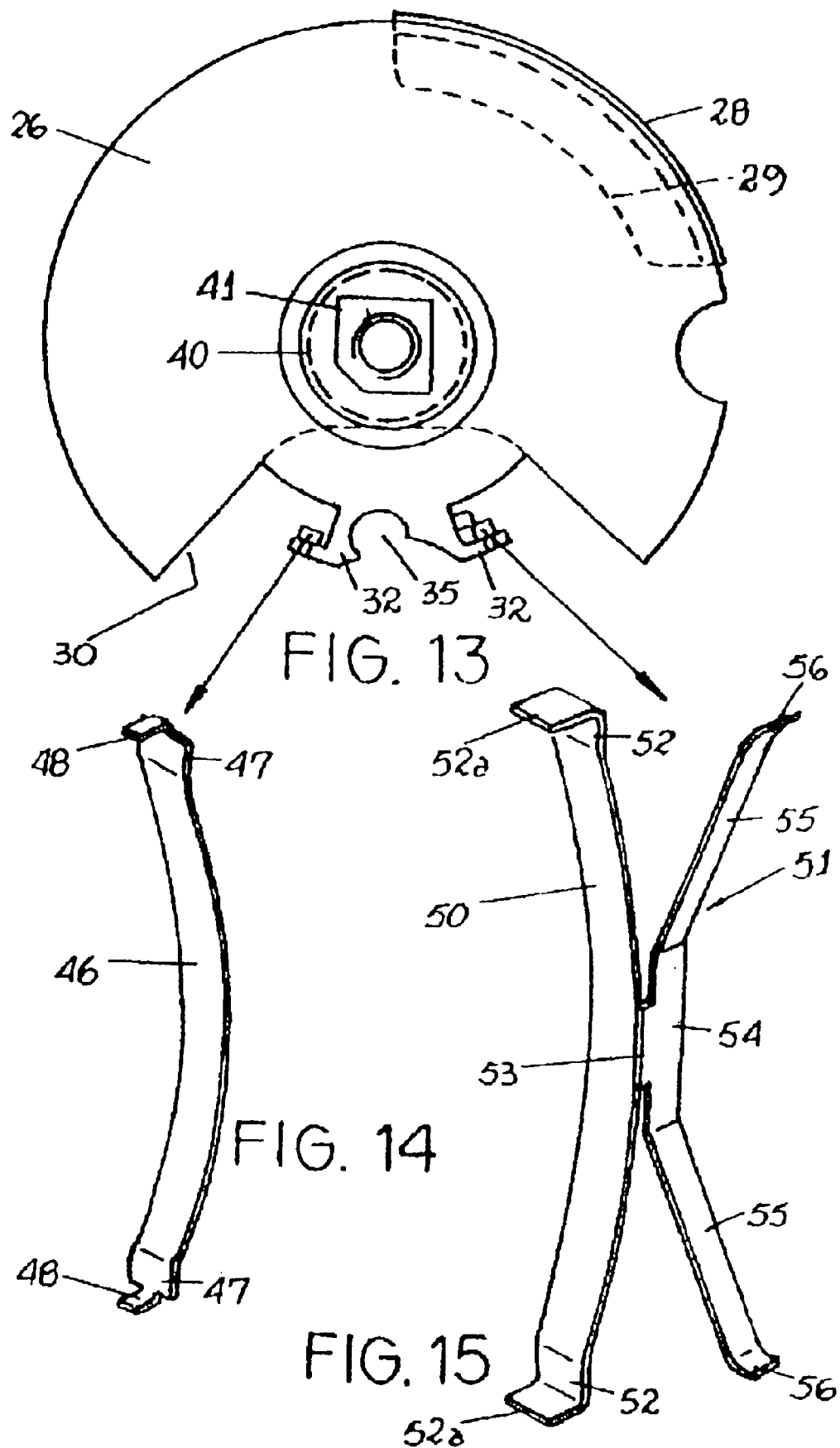

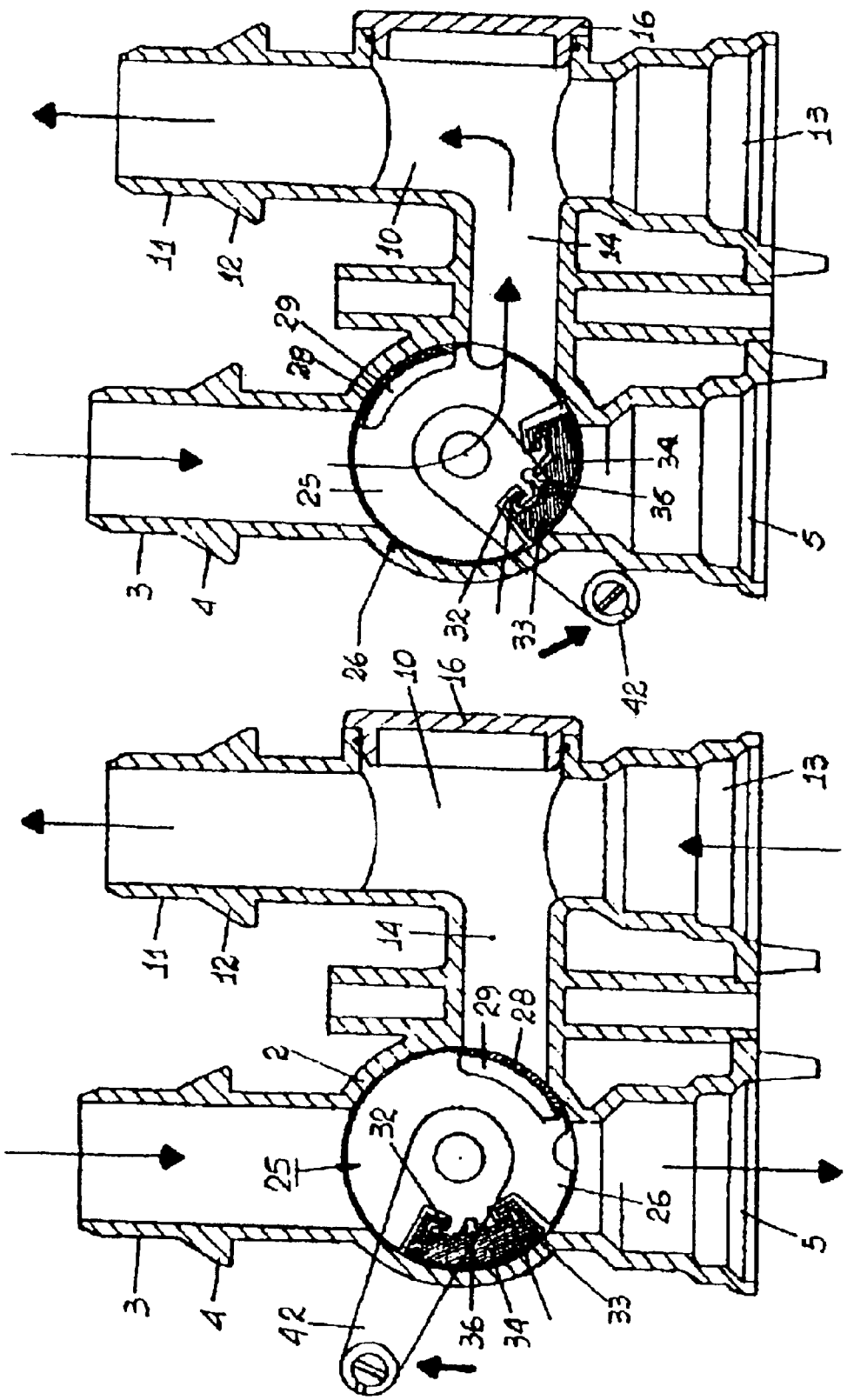

WATER FLOW CONTROL VALVE

TECHNICAL FIELD

This is a patent for a Water Flow Control Valve for use in the automobile industry; more specifically in the heating system for the driver's cab. This patent follows the criteria of the Utility Model patent since it combined and modified some of the system's well-known elements and set them out in a new way and/or relocated some of the components, which increased its efficiency, improved its performance and made it more practical to use.

DISCLOSURE OF THE INVENTION

The main purpose of this Water Flow Control Valve is to divert hot water from the vehicle's engine to the heating system installed in the cab of the vehicle. This system shows some important improvements over conventional valves and, consequently, provides a number of technical, practical, functional ad efficiency advantages. In addition, it is extremely safe, has the guarantee of being absolutely accurate in its operation and has a much improved performance specification, since the sealing system is extremely trustworthy and conforms to the prerequisites of minimum seepage per any given pressure.

This water flow valve is installed between the interconnection of the motor with the radiator and the vehicle cab's heating system. Since it is compact and its dimensions are reduced installation is extremely easy; very little labor is necessary. It is also extremely economical because several of the devices and components used in conventional heating systems are eliminated.

The valve itself consists of an outer casing which contains a compartment for housing the rotor with an adjacent cavity linked by an intermediate channel either as the liquid by-pass or for returning it to the engine when it is not being diverted to the heating system. The rotor compartment has an inlet tube attached to it which brings hot water from the engine and an outlet tube which is linked to the vehicle cab's heating system. To the adjacent cavity is attached an outlet tube for liquid coming from the engine's cooling system (radiator). It also has an opening for allowing the inflow of liquid returning from the cab's heating system.

The rotor has a fixing system which allows a sealing device to be attached to it. This sealing device is responsible for ensuring that the no liquid whatsoever passes into the heating system when heating in the cab is not required. It also ensures that that the by-pass is sealed off when heating in the cab is required. This rotor is controlled manually by means of an external handle.

For a accurate picture of the Water Flow Control Valve, see the attached diagrams (not to scale). They are referred to in the following detailed descriptions to make things clearer.

DESCRIPTION OF THE DRAWINGS

FIG. 8: Perspective views of the sealing unit, consisting of an O ring and its support (shown separately).

FIG. 9: A perspective view of the rotor with the sealing unit (O ring and support) attached.

FIG. 13: View of the design of the rotor showing details of the position of the metal springs (single and double) attached to the part.

FIG. 14: View of the single metal spring.

FIG. 15: View of the double metal spring.

FIGS. 17 and 18: Cross-sectional views showing how the Water Flow Control Valve works.

BEST MODE FOR CARRYING OUT THE INVENTION

Figure 1:
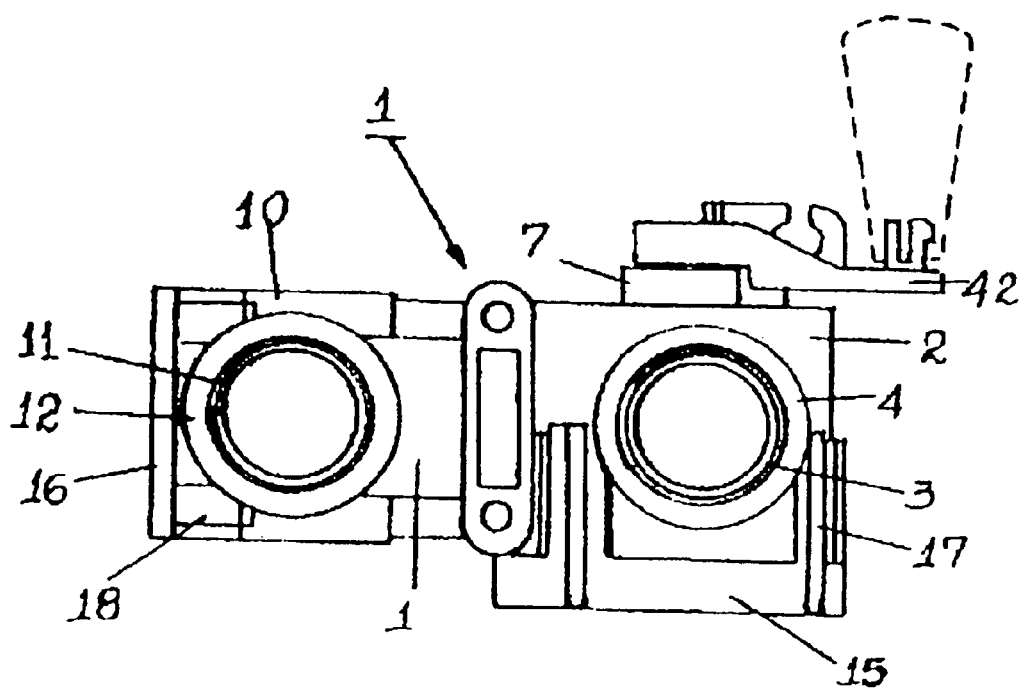
FIG. 1: Front view of the Water Flow Control Valve.
Figure 2:
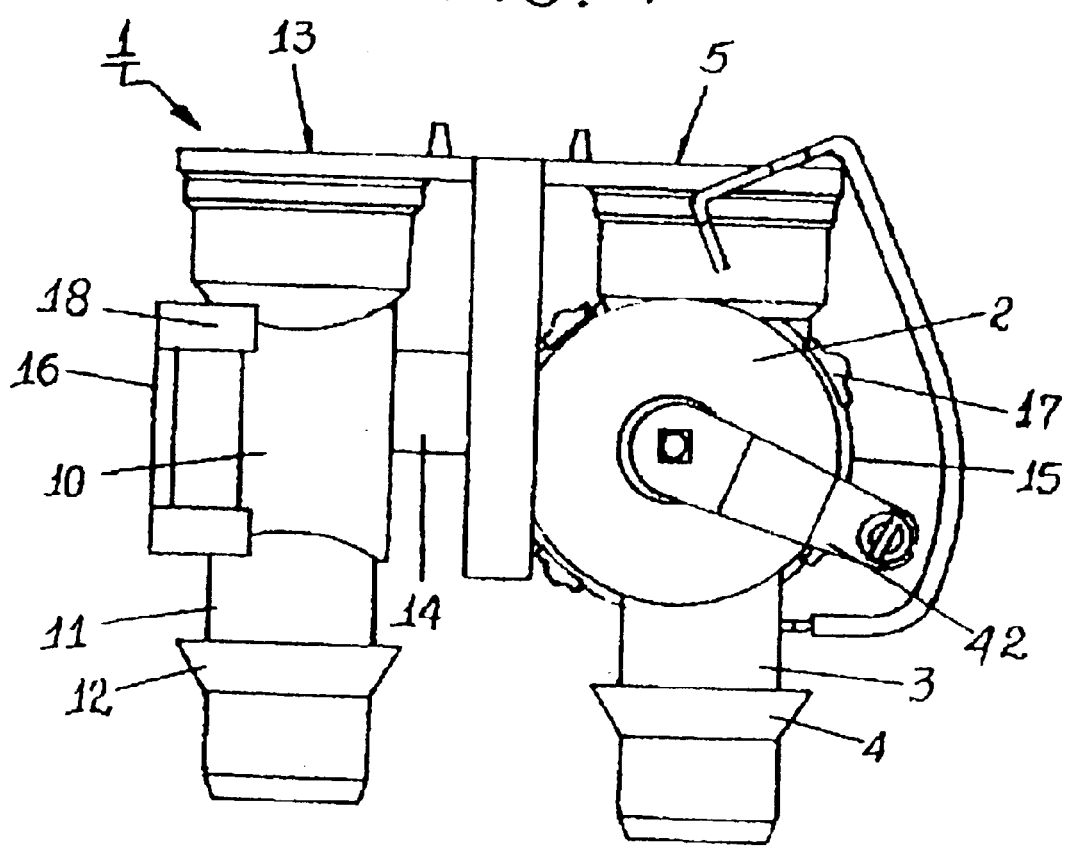
FIG. 2: View from above.
Figure 3:
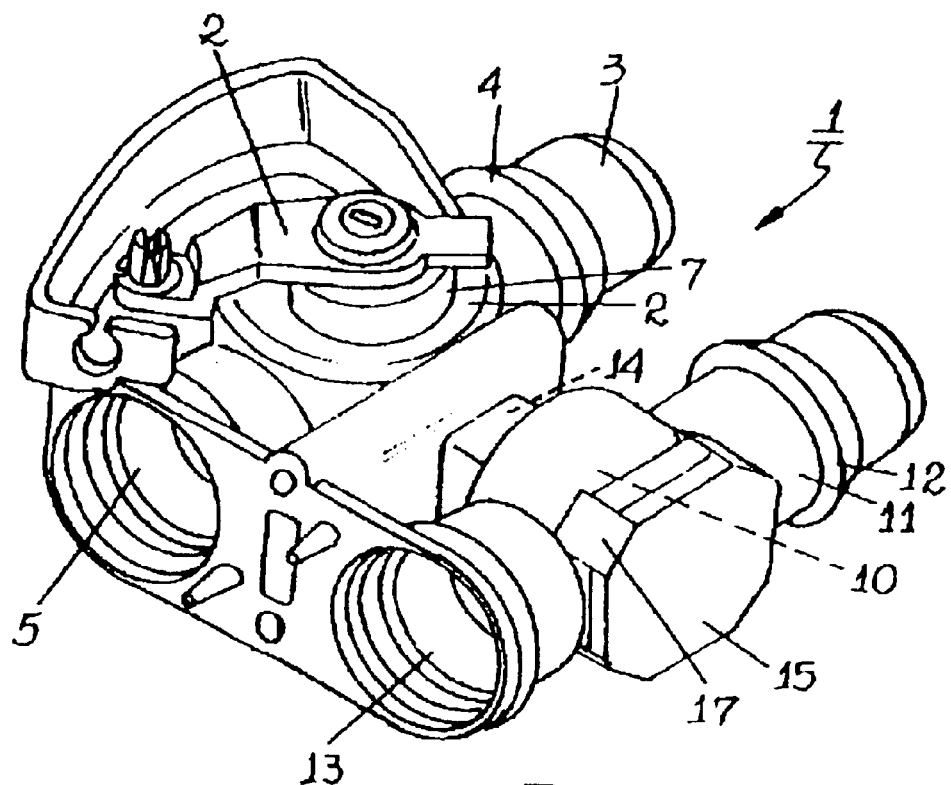
FIG. 3: Side view.
Figures 4, 5:
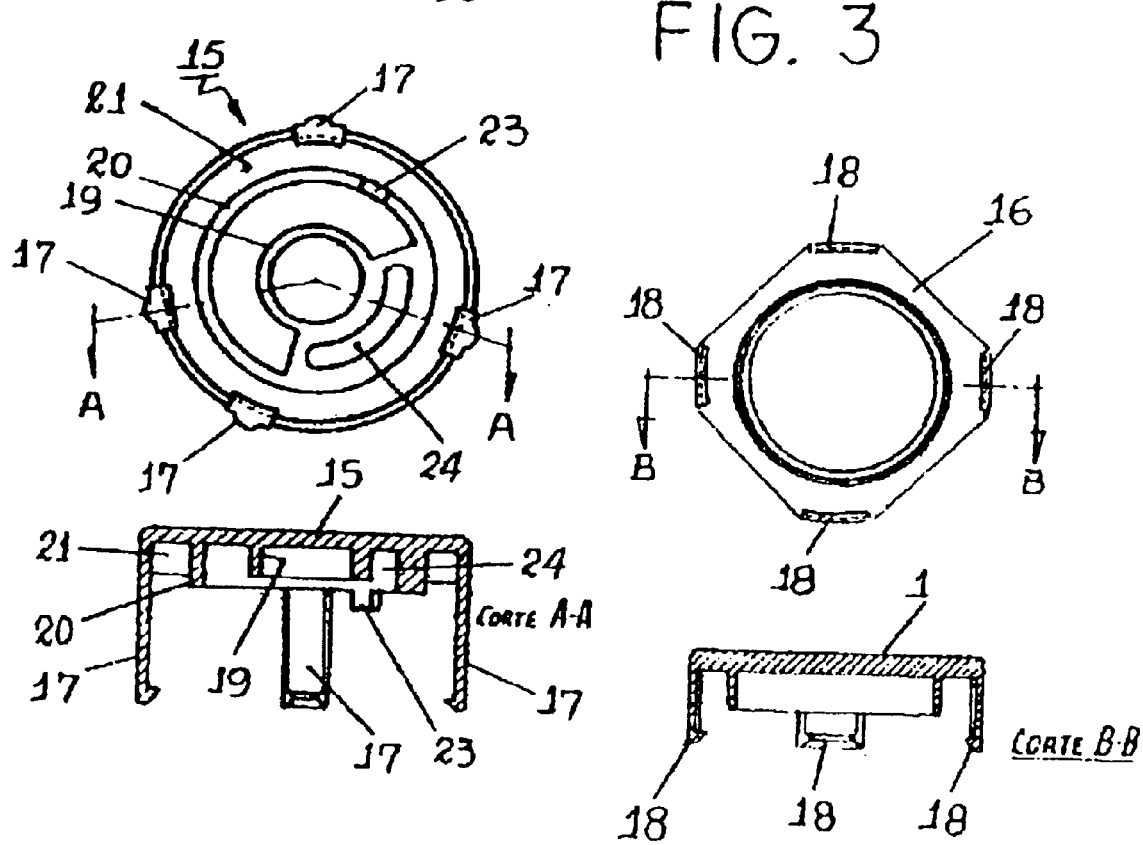
FIG. 4: View of the cover of the rotor housing compartment, showing the design (from below) and in cross section through the plane indicated by the A—A line.
FIG. 5: View of the cover of the adjacent cavity, showing the design (from below) and in cross section through the plane indicated by the B—B line.
Figure 7:
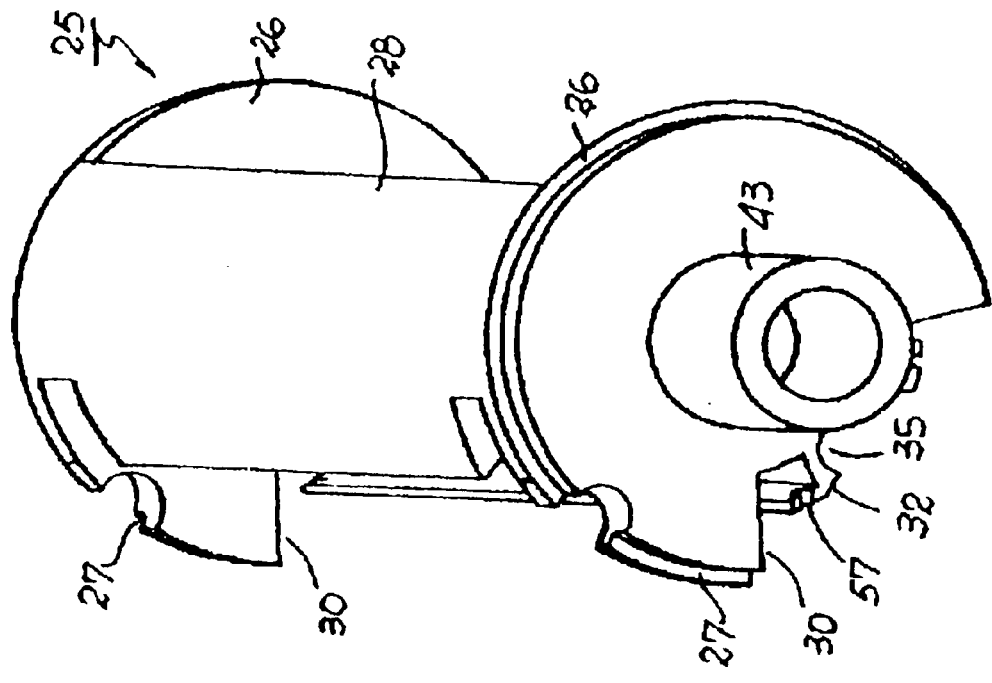
FIG. 7: A perspective view of the rotor, seen from below and from the opposite angle to the previous view.
Figure 6:
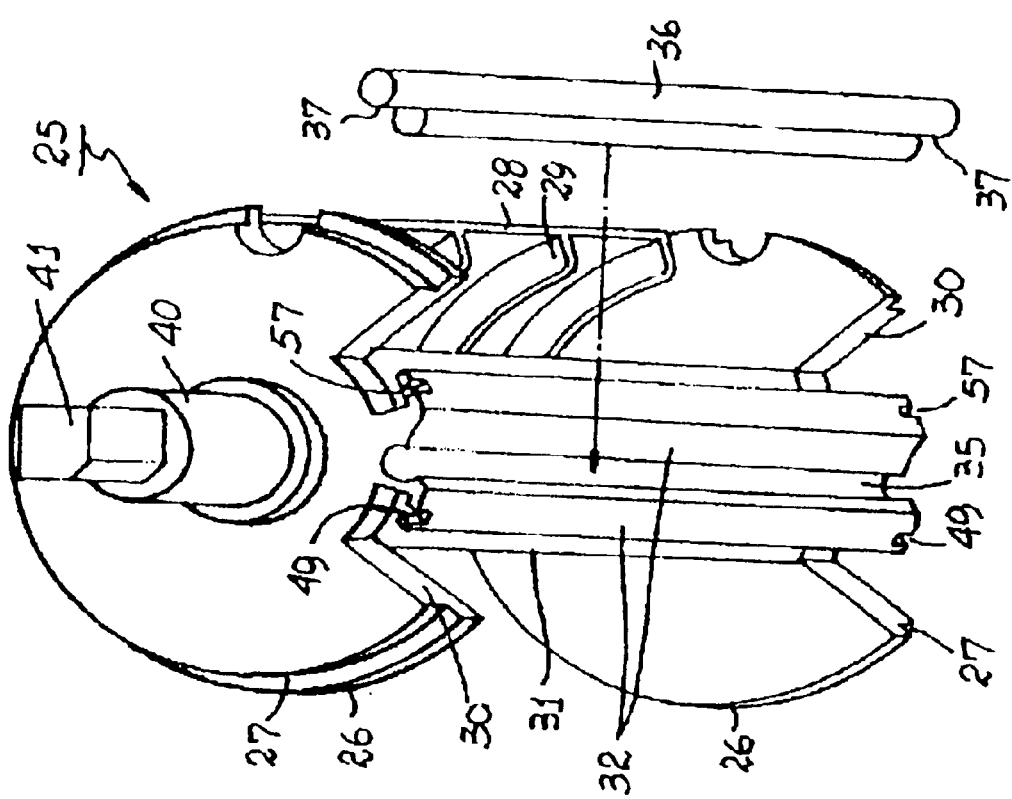
FIG. 6: A perspective view of the rotor, seen from above and the articulation rod.
Figure 10:
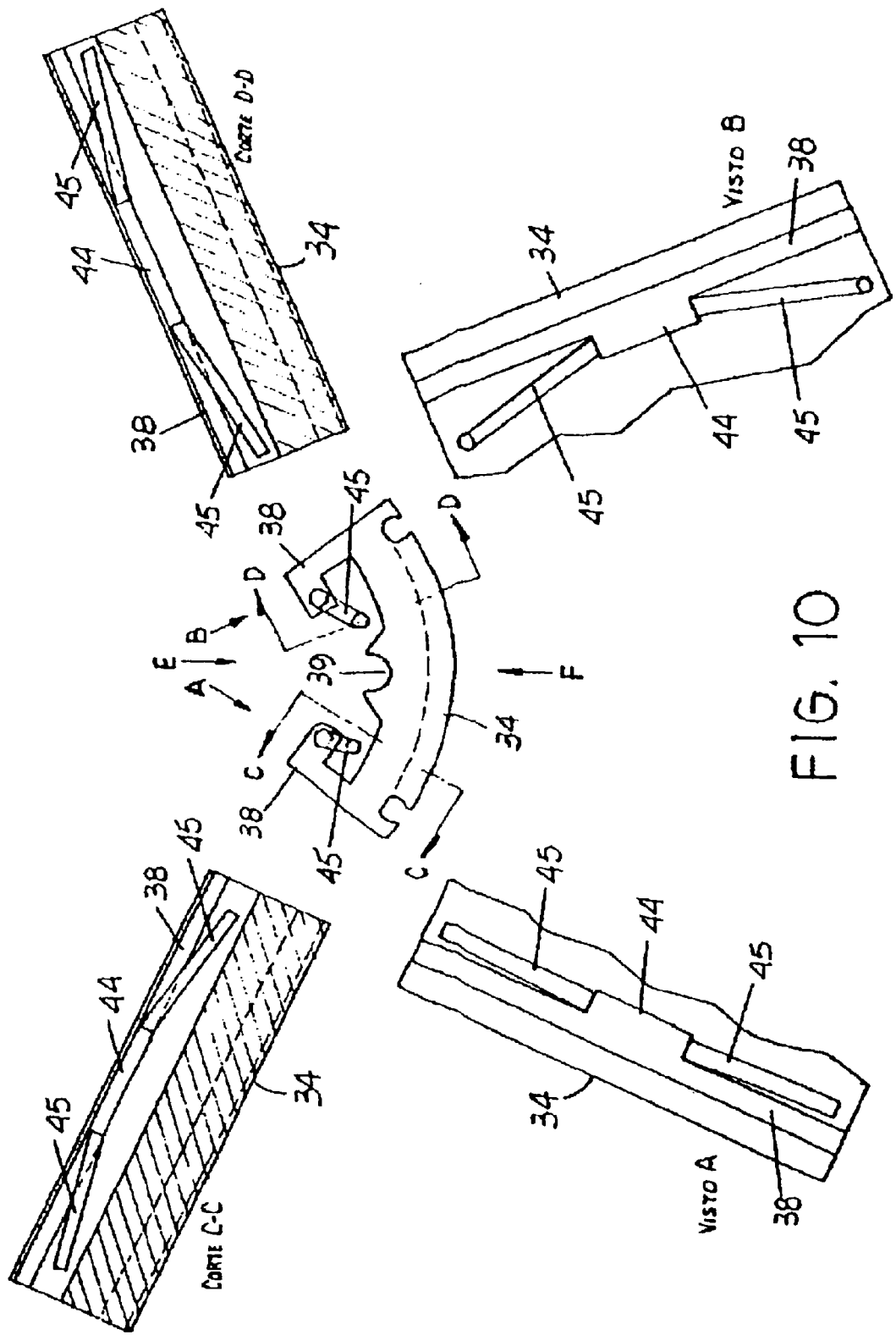
FIG. 10: View from above of the sealing unit support and its details, as seen from points A and B and the cross-sections C—C and D—D, with details of the positioning of the springs which are molded to the part.
Figure 11:
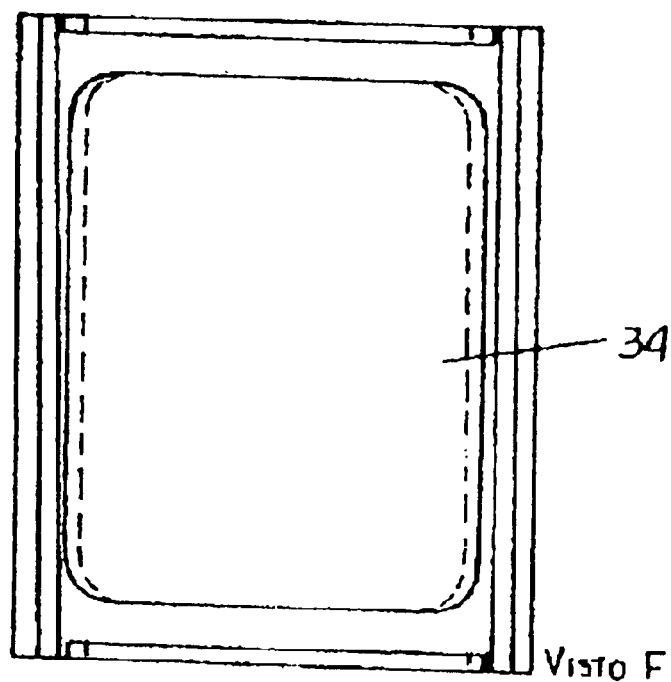
FIG. 11: Front view (seen from position F, as indicated in the previous diagram) of the sealing unit support.
Figure 12:
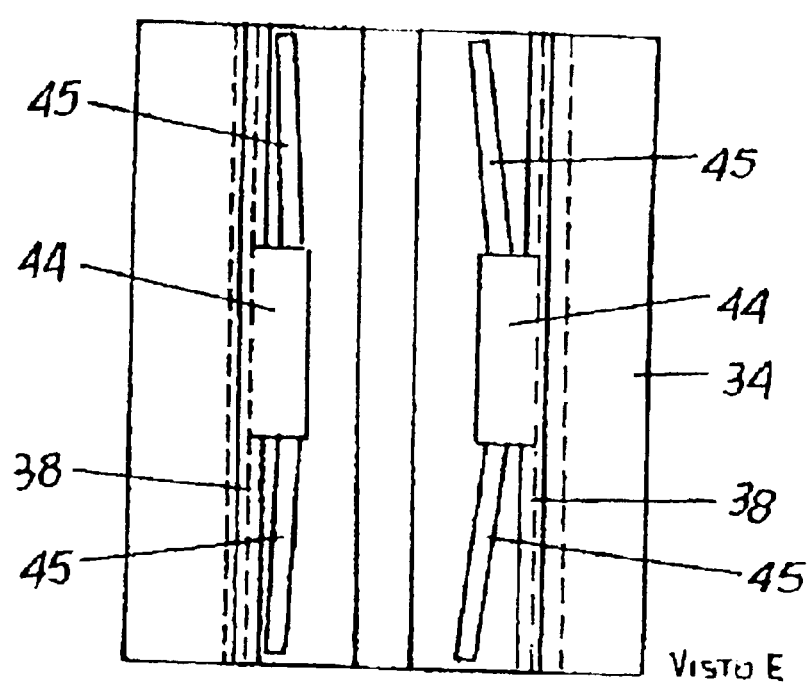
FIG. 12: View from below (seen from position E, as indicated in diagram 10) of the sealing unit support.
Figure 16:
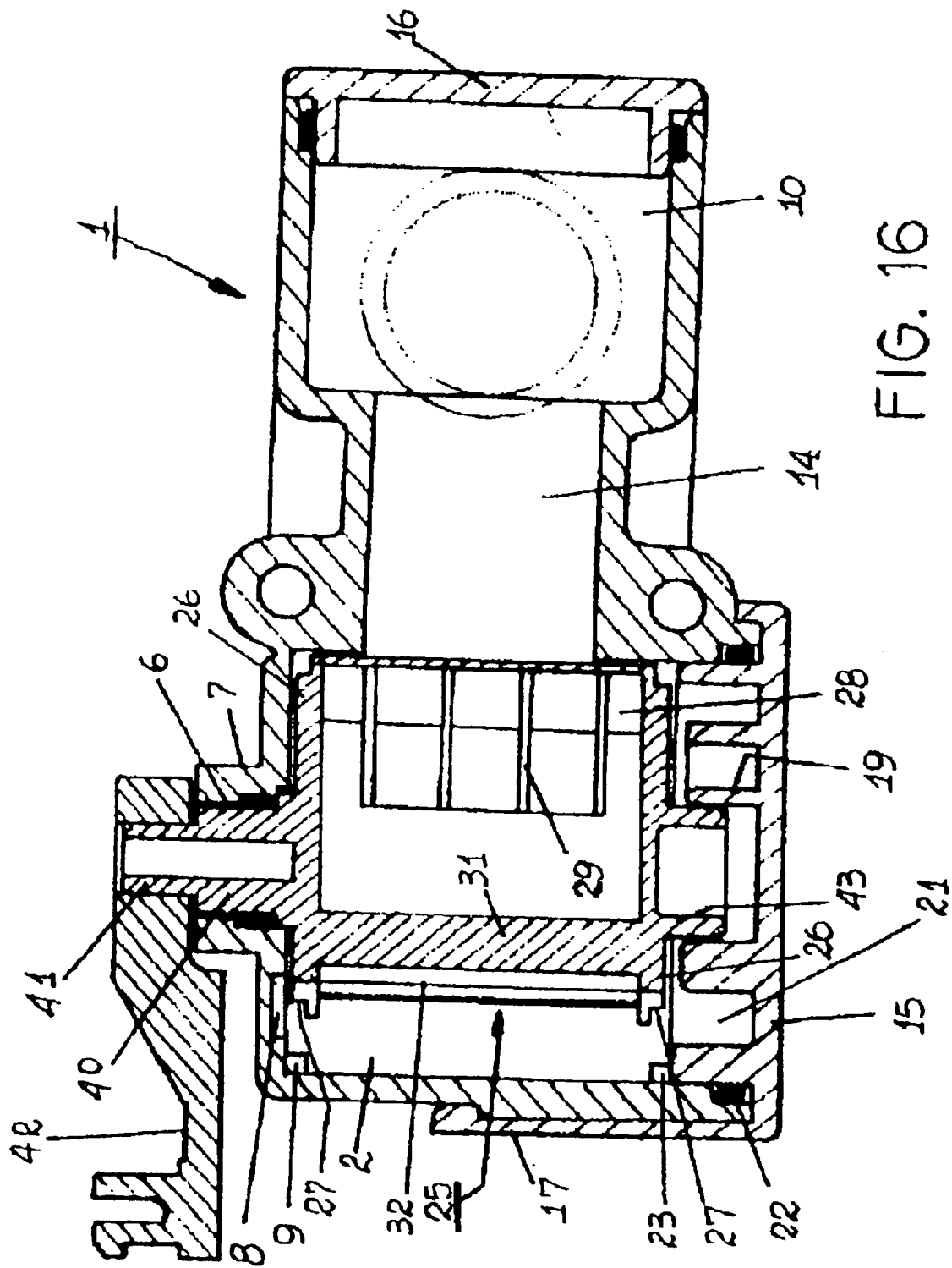
FIG. 16: Lengthwise, cross-sectional view of the area where the rotor is housed.
Figure 19:
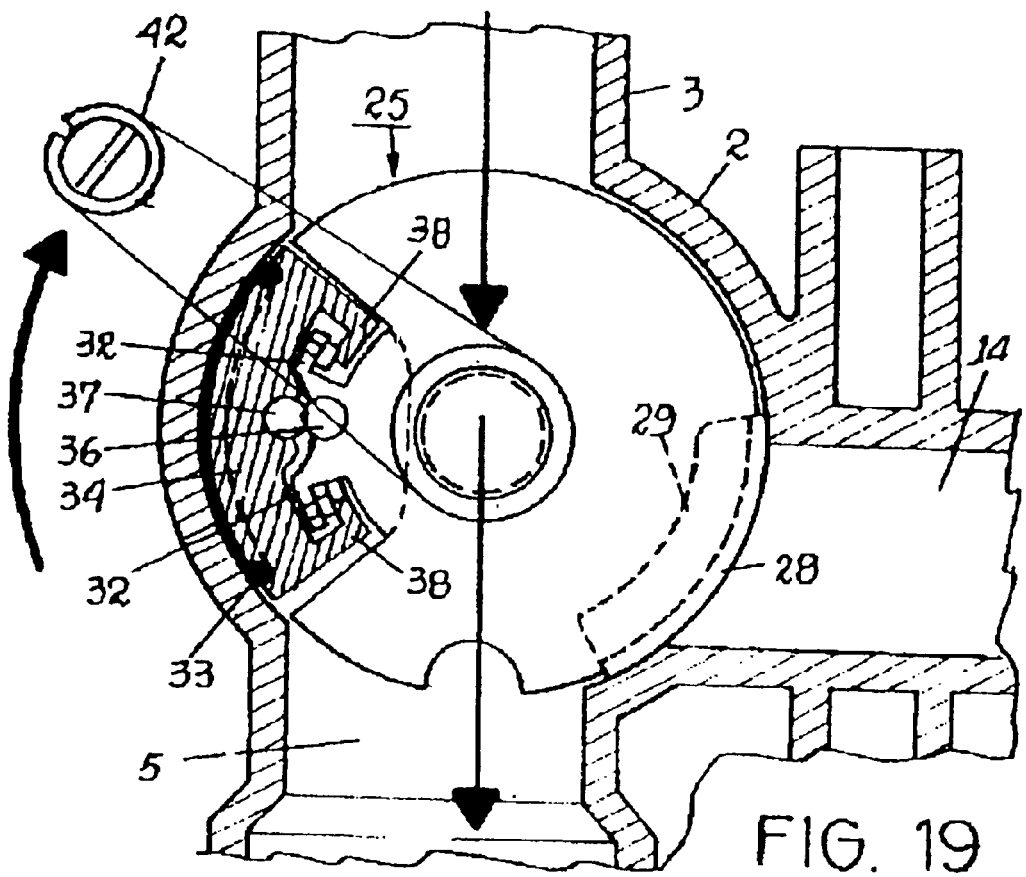
FIGS. 19 and 20: Show details (enlarged from diagrams 17 and 18) of the working of the Water Flow Control Valve.
Figure 20:
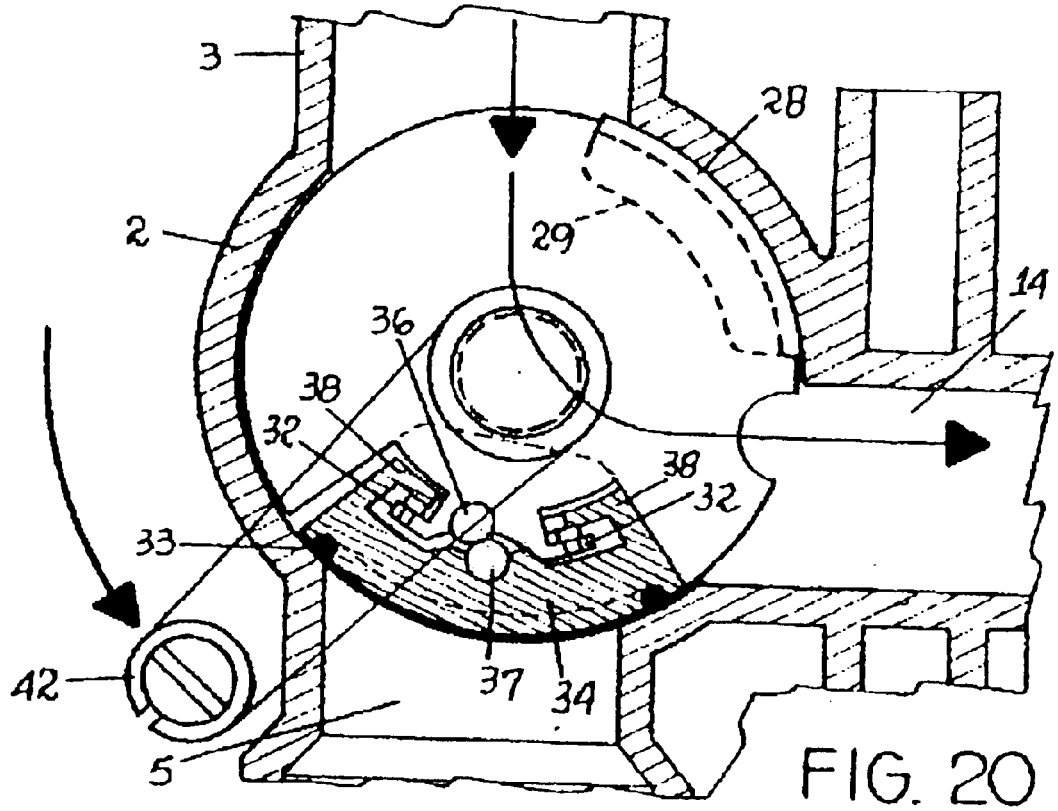

As can be seen from the diagrams and the details the Water Flow Control Valve consists of a housing unit (1) which has a circular compartment (2) which has a tubular extension (3) with an external conical ring (4). This extension is used for attaching the hose which comes from the motor. On the opposite side is an outlet (5), to which is attached the vehicle cab's heating system hose. In the base of the compartment (2) there is a central hole (6) which extends along a short external tube. At the bottom of the compartment (2) there is also a cavity which acts as the upper guide (8) for the rotor's movement and a lug (9), the purpose of which is to increase the pressure on the sealing unit when required for blocking off the flow of liquid from the engine to the cab's heating system. There is also an adjacent cavity (10) to which is coupled a tubular extension (11) with an external conical ring (12) which is used for attaching the return hose to the engine's cooling system (radiator). On the opposite side there is an opening (13) which is used for attaching the return hose from the cab's heating system.

The compartment (2) is linked to the adjacent cavity (10) by means of an inter-connecting channel (14) for the auxiliary flow or by-pass of liquid. Both the compartment (2) and the adjacent cavity (10) have their respective covers (15 and 16) with securing clamps.

On its inner surface, the compartment (2) cover (15) has two concentric circular walls, one in the center (19) for centralizing the rotor when it is being assembled and an intermediate one (20) which is a certain distance away from the edge of the cover. This results in a space (21) used for lodging the opening of the compartment (2) when closed, by means of the sealing ring (22). On the edge of this intermediate wall (20) there is a small protuberance which forms a lower lug (23) which, in alignment with the lug (9) in the bottom of the compartment (2) and combined with it, moves sideways onto the sealing unit when it is blocking liquid from flowing into the vehicle cab's heating system. It also has a rotor movement lower guide (24) cavity.

The compartment (2) is of sufficient size to house the rotor (25), which has special physical characteristics. It is made up of two disc-shaped end elements (26), the rims of which have been lowered (27). They are joined by a lateral wall (28) which extends a few millimeters, the internal surface of which has several fins (29) placed at varying different levels transversally. Opposite this lateral wall (28) the aforementioned end elements (26) have a recess (30), the bottom edges of which are joined by a vertical plane (31) to which is molded a lengthwise, special sectional-shaped part which forms a device (32) for attaching the sealing unit, comprising an O ring (33) and its support (34); this is used for blocking the flow of liquid to the cab's heating system. Between the fixing system (32) there is housing (35) for part of the sealing unit's leverage mechanism, which is in the form of the figure "8" (36). One part of the "8" has its ends lengthened (37) so that they can be seated in and move within the cavities of the upper (8) and lower guides (24) which are situated in the bottom of the compartment (2) and on the inner surface of the cover (15) respectively. On the bottom of the O ring (33) support there is an adjustable mechanism (38) for attaching it to the fitting system (32) of the rotor. The support also has a channel along its length (39) by means of which the other part of the "8"-shaped (36) articulating lever is moved up and down.

At the top of the rotor (25) there is a stout, axle-like pin which has an off-center square extension, with a beveled corner. This pin passes through the central hole (6) in such a way as to expose the square extension (41), to which is attached the manually-controlled lever (42). On the bottom of the rotor (25) there is a small tubular projection (43) which, when assembling the rotor in its compartment (2) is fitted by means of a screwing motion to the central circular wall (19) of the cover (15) of the compartment (see diagram 16).

The rotor (25) is housed in the interior of the compartment (2) in such a way that the sealing unit, or more precisely the O ring (33) attached to the support (34) and the side wall (28) which extends a few millimeters, are in contact with the inner wall of the compartment as can be seen in diagrams 17, 18, 19 and 20.

The sealing unit is attached to the rotor and acts under the pressure of springs which can either form part of the O ring (33) support (34) itself—diagrams 10 and 12—or can be made up of different metallic elements—diagrams 13, 14 and 15—assembled between the coupling grooves of both parts.

In the first case the support (34) has a protruding part (44) fixed in the middle of the fitting grooves (38) which contain flexible rods (45) which control the springs; on one side these springs are used to press the sealing unit (when the rotor moves) and, on the other side, the springs are used to press the sealing unit out (when blocking the flow of liquid to the vehicle cab).

In the second case, the springs are made from tempered steel and are either single or double. The single model (diagram 14) is made from one piece of slightly curved steel (46) with aligned ends (47), each having a tongue bent backwards at 90°. The single spring (46) is placed on one side of the fixing system (32) of the rotor (diagram 13) and is fixed by means of the tongues (48) which are placed in slots (49) in the sides of the fixing system. They press the sealing unit inwards when the rotor moves.

The double spring (diagram 15) consists of a pair of blades (50 and 51), one of which is slightly curved, with aligned ends (52) which are doubled back at a 90° angle. The other blade (51) is joined perpendicularly to the first by means of a thin central projection (53) and having a part in the middle (54) from which there are two extensions bent backwards at a 60° angle (approximately), the points of which are slightly curved (56). This double spring is fixed to the other side of the rotor (diagram 13) fixing system (32), with the curved blade supported in the bottom of the housing, its angled ends fixed to the surface of the system and the perpendicular blade resting on the leg of the support, with its angled ends (56) fixed in the slots (57) in the edge of the leg. This is to press the sealing unit outwards when blocking liquid flow to the vehicle cab's heating system.

As can be seen in diagram 17 and from the detail in diagram 19, the channel (14) which links the compartment (2) with the adjacent cavity (10) is blocked by the side wall (28) of the rotor. The outlet (5), on the other hand, is unobstructed. In this case the hot liquid from the engine which comes in via the tubular extension, flows out through the outlet (5) in the direction of the vehicle cab's heating system. After passing through the heating system and heating the cab, the liquid returns to the engine's cooling system (radiator) via the inlet (13) and the tubular extension (11). The flow volume is controlled by the pressure as regulated by the by-pass.

When not wishing to heat the cab, the driver actions the rotor by means of the lever (42) placing it in such a position that the sealing unit—the O ring (33) attached to the support (34)—moves inwards under pressure from the single spring (46) and blocks the outlet (5). Consequently the side wall (28) no longer obstructs the linking channel (14). In this case, as shown in diagram 18 and in the detailed diagram 20, hot liquid from the engine is diverted to the adjacent cavity (10) and from there returns to the cooling system of the engine (radiator) via the tubular extension.

The revolving movement of the rotor is guided by the extended ends (37) of the jointed "8"-shaped lever moving in the cavities of the upper (8) and lower (24) guides which are in the bottom of the compartment (2) and on the inner surface of the cover (15) respectively. Whilst the rotor is being moved, the metal strip (9) in the bottom of the compartment and the metal strip (23) on the inner surface of the cover (15) slide along the lowered edges (27) of the rotor. When the rotor is revolved to obstruct the flow of liquid to the cab's heating system, the support (34) of the sealing unit touches the metal strips (9 and 23), which stops the rotor revolving any further. There will then be a counter-pressure to the rotor revolving any further and this will affect the sealing unit, which will move sideways along the lever (36). This is caused by the double metallic spring (51) or by the spring incorporated in the support (34). The result of this sideways movement is greater pressure from the O ring (33) against that part of the inner wall of the compartment (2) which surrounds the mouth of the outlet (5), thus increasing the sealing effect. The minimum flow is controlled by the pressure defined by the heating system.

In this way the Water Flow Control Valve fully satisfies its objectives since it carries out in a practical and efficient way the function for which it was designed. It has a series of technical, practical and functional advantages and in addition to its own innovative characteristics, fulfills the fundamental requirement, that it is entirely new in its design.

What is claimed is:

1. A water flow control valve for a vehicle heating system comprising: a housing unit (1) having a compartment (2), having an open end and a fluid inlet and a fluid outlet, a flow controlling rotor (25) housed in the compartment (2), an adjacent cavity connected to the compartment (2) the adjacent cavity having a fluid inlet and a fluid outlet, the compartment (2) having a removable cover mated thereto, the cover having a middle concentric wall for centering the rotor for rotation and an intermediate wall spaced away from an edge of the cover for fitting to the compartment open end, sealing means for sealing the cover to the compartment, the cover having hub means for attaching to the housing unit, the adjacent cavity having a removable cover sealing engaged to the housing unit for covering the open end thereof, the compartment having a guide cavity in a surface thereof for guiding rotation of the rotor therein, and means for displacing the rotor from a first position when flow travels from the compartment inlet to the compartment outlet and a second position where the flow travels from the compartment inlet to the bypass channel to the adjacent cavity outlet.

2. The water flow control valve of claim 1 wherein the rotor comprises two disk shaped end elements joined by a lateral wall, having a plurality of fins on an inner surface thereof.

3. The water flow control valve of claim 1 wherein the rotor comprises the disk shaped end elements joined by a vertical strip having a seal unit support and means for mounting a sealing unit to the seal unit support.

4. The water flow control valve of claim 3 wherein the sealing unit comprises a semicylindrical wall sized for blocking the compartment outlet, the wall having a sealing ring mounted thereon.

5. The water flow control valve of claim 4 wherein the sealing unit has lever ends on opposite sides thereof extending into the upper guide cavity and into a lower guide cavity located in the compartment cover.

6. The water flow control valve of claim 1 further comprising an external lever engaged to the rotor through a cavity in the housing unit for rotating the rotor from the first position to the second position.

7. The water flow control valve of claim 1 wherein the rotor has a tubular extension which resides in middle concentric wall of the compartment cover.

8. The water flow control valve of claim 3 wherein the lower disk shaped end element has a cut-out for slidably mounting the sealing unit to the vertical strip.

9. The water flow control valve of claim 3 wherein the vertical strip has a pair of extensions for slidably receiving the seal support thereover, and a longitudinal groove for receiving an "8" shaped locking element therein.

* * * * *